United States Patent Office 2,767,999
Patented Oct. 23, 1956

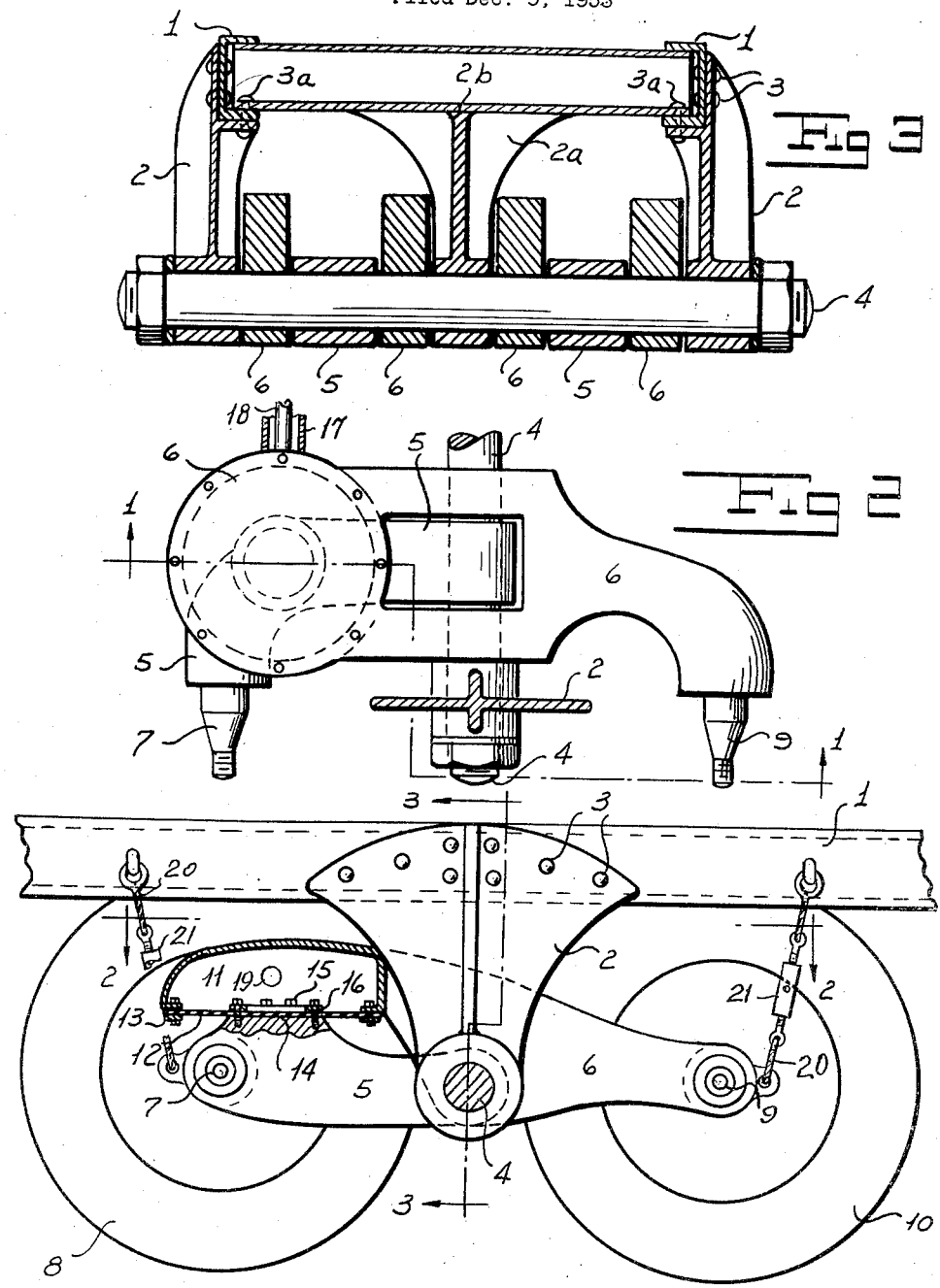

2,767,999

PNEUMATIC SUSPENSION FOR TANDEM AXLE VEHICLE

Rene Gouirand, New York, N. Y.

Application December 9, 1953, Serial No. 397,197

7 Claims. (Cl. 280—104.5)

This invention relates to pneumatic suspensions for vehicles and, while adapted for general application in this art, is particularly useful when associated with trucks, tractors and trailers.

The object of the invention is to provide a novel pneumatic suspension of simple rugged construction and high efficiency.

The suspension of this invention is primarily directed to tandem wheel vehicles, i. e., vehicles wherein the weight is supported, particularly at the rear, on wheels arranged one in advance of the other with like arrangement of wheels at each side of the vehicle. These wheels may be carried by axles, but spindles are found to be more desirable as they provide an independent mounting for each wheel and permit each wheel to follow the surface of uneven roads without transmitting to the chassis frame or body of the vehicle twisting strains which would result from a less flexible structure.

The present invention is characterized by the use of an independent support at each side of the vehicle, comprising a pair of levers preferably mounted upon a common pivot or fulcrum. These levers, respectively, project fore and aft of the pivot and each carries a wheel spindle to which the tandem wheels are affixed. One of the levers is extended to overlap the other and the overlapping portions of both levers are connected to spaced apart portions of a flexible diaphragm extending across the otherwise open side of a chamber formed in one of them. This chamber is adapted to contain compressed air which serves as a cushion to support the weight of the chassis frame and its superimposed body and load. A single air chamber, associated with the levers as stated, is ordinarily sufficient to carry heavy loads, although, in practice, both levers may be so constituted that they will overlap one another at both sides of the pivot with a diaphragm and associated air chamber both fore and aft of the pivot. The pivot on which the levers are mounted may be conveniently in the form of a shaft extending transversely of the vehicle and supported at its opposite ends on brackets secured to the side bars of the chassis frame.

Features of the invention, other than those adverted to, will be apparent from the hereinafter detailed description and appended claims, when read in conjunction with the accompanying drawing.

The accompanying drawing illustrates one practical embodiment of the invention, but the construction therein shown is to be understood as illustrative, only, and not as defining the limits of the invention.

Fig. 1 is a side elevation of a suspension embodying the present invention with a portion thereof shown in central vertical section in the plane of the line 1—1 of Fig. 2.

Fig. 2 is a plan section on the line 2—2 of Fig. 1 with the wheels removed.

Fig. 3 is a section on the broken line 3—3 of Fig. 1.

Referring to the drawings, 1 designates the side bars of the chassis frame of a vehicle. These bars commonly support superimposed bodies of trucks and trailers. At the opposite sides of the chassis frame are depending brackets 2 secured to the side bars in any appropriate manner, as by rivets 3. These brackets support a transverse shaft 4 which serves as a pivot or fulcrum for levers 5 and 6. The shaft 4 is preferably supported by an additional center bracket 2a carried by a transverse beam 2b secured to the chassis frame by rivets 3a.

In the form of the invention illustrated in the drawings, the levers 5 extend forwardly of the shaft and carry at their free ends wheel spindles 7 to which are affixed wheels 8 which may be of the single or dual type. The lever 6 is pivoted intermediate its ends to the shaft 4. One arm of said lever extends to the rear of the pivot and is provided at its free end with a wheel spindle 9 to which one or more wheels 10 are affixed. The wheels 8 and 10 are thus positioned in tandem and traverse the same track. The other arm of the lever 6 extends forwardly of the pivot to overlap and overlie the lever 5 and formed therein is a hollow cavity constituting an air chamber 11. This chamber has an open bottom closed by an elastic diaphragm 12 which is marginally secured to the margin of the opening by means of bolts 13 or in any other appropriate manner to hermetically seal the chamber 11.

The air chamber 11 is of a size appropriate to the maximum loads to be carried and it may be of any desired shape although in the drawings it is shown as circular with an associated circular diaphragm. This diaphragm normally occupies a substantially horizontal plane and overlies a seat 14 formed on the top of the lever 5. This seat 14 bears against substantially the central portion of the diaphragm 12 and is secured to such diaphragm by screws 15 acting on the diaphragm through an interposed washer ring 16.

I have referred to the lever 5 as centrally secured to the diaphragm. These parts are, however, preferably attached to one another a little closer to the pivot shaft 4, so that the diaphragm will operate more efficiently under the influence of the different radial portions of the lever 5.

In order to permit the levers to be overlapped in the manner described, the lever 6 is bifurcated in the region of the shaft 4, as shown best in Figs. 3 and 4, so as to permit of free oscillation of the levers without binding.

The weight of the chassis frame and body will be transmitted through the brackets 2 to the shaft 4, but will be supported by compressed air within the chamber 11 for it will be apparent that the lowering of the shaft 4 under such weight will bring about a movement of the overlapping ends of the lever toward one another. When so moved, the diaphragm 12 will be correspondingly flexed to increase the pressure of the air in the chamber 11 sufficiently to counterbalance the load. When the load has been counterbalanced by these opposing forces, the rising or lowering of the individual wheels during their passage over an uneven surface in the road will bring about corresponding movement of the lever on which the spindle of said wheel is supported without affecting the horizontal position of the other wheel spindles and the shock resulting from any bump thus encountered by a wheel will be dissipated by the cushioning action of the compressed air in the chamber 11. In order to preclude excess lowering of any of the wheels in the event they pass over a deep hole in the road, any appropriate form of snubber may be employed, such, for example, as a limiting cable connection between the free end of each lever and the chassis frame.

In practically applying the present invention to a vehicle chassis frame, the suspensions at both sides of the vehicle may be arranged in the identical manner shown in Fig. 1 with the chambers 11 of both suspensions arranged forwardly of the shaft 4. However, if these chambers are made of such large size as to interfere with their placement side by side transversely of the vehicle, the suspension at one side may be reversed from the suspension at the opposite side. That is to say the chamber 11 at one side of the vehicle may be positioned forwardly of the shaft 4 while the corresponding chamber at the opposite side of the vehicle may be positioned rearwardly of that shaft.

It is to be noted that inasmuch as the vertical movement of the wheels during their passage over uneven surfaces is transmitted to the body through the levers as described, the vertical movement of the shaft 4 will be negligible as compared to the vertical movement of the axle spindles and consequently the vertical movement transmitted to the vehicle body is therefore minimized and smooth riding assured even over very rough roads.

Each of the chambers 11 of the two suspensions at the opposite sides of the vehicle may operate independently. However, these chambers may be made to interact with one another by connecting them together. The connection between them may be of any interconnecting passage, but a very convenient form is shown in Fig. 2. In this figure, an outer flexible casing 17 is connected at its opposite ends to bosses formed on the exterior of the respective chambers 11 and within this casing is positioned a tube 18, the interior of which is in communication with the interior of the two chambers 11 at openings 19, one of which is illustrated in Fig. 1. The inner tube 18 is preferably of elastic character, so that it may radially expand and contract under the varying internal pressures to which it may be subjected by air pressure therein, while the outer casing 17 is preferably inelastic so that it will not stretch radially. Because of the elasticity of the inner tube, it will function in effect as a surge chamber to take up and cushion sudden shocks. Over-distension of the inner tube, such as might cause rupturing thereof, is safeguarded against by the outer casing 17, which, in practice, is preferably provided with one or more openings or perforations, so that air between the casing 17 and the tube 18 will not interfere with the proper function of the inner tube as a surge chamber.

The interconnection between the chambers 11 just described may be connected at the adjacent sides of the chambers 11, as shown in the drawings, or at the ends or tops thereof, as may be then convenient for any particular installation.

While the structure shown in the drawings is primarily intended for use in tandem wheel constructions, it is possible, should occasion require or it be desirable either temporarily or permanently, to utilize only one set of wheels in contradistinction to the tandem arrangement. Snubbers provide a convenient means to this end. As shown in Fig. 1, these snubbers, indicated generally by the reference character 20, are equipped with turn buckles 21, whereby they may be adjusted to different lengths. These snubbers operate in the manner of conventional snubbers under ordinary conditions. However, should it be desired to utilize one set of wheels only, this may be accomplished in the following manner:

The air pressure in the chambers 11 at the opposite sides of the vehicle may be lessened and, while thus lowered, the snubbers adjacent those particular chambers may be shortened by adjusting the turn buckles. If the pressure in the chambers is thereafter increased, the wheels contiguous to the shortened snubbers will be elevated from the ground and the entire weight of the vehicle will be carried by the remaining wheels. The thus elevated wheels may then be removed and the vehicle operated without the tandem arrangement. By like procedure, the elevation of any particular wheels from the ground will permit changing of wheels, adjusting brakes, etc., without the necessity of jacking.

Compressed air may be supplied to the chambers 11 of the vehicle suspension of this invention in any appropriate manner from any source of air under pressure.

The foregoing detailed description sets forth the invention in its preferred practical form, but the invention is to be understood as fully commensurate with the appended claims.

Having thus fully described the invention, what I claim as new and desire to secure by Letters Patent is:

1. A pneumatic vehicle suspension comprising: a vehicle body, a horizontal pivot supported on the body, wheel carrying spindles arranged fore and aft of said pivot and to which wheels are adapted to be affixed, a lever secured to each wheel spindle and fulcrumed on said pivot with at least one arm of one lever extending beyond the pivot and overlapping the contiguous arm of the other lever, and a pneumatic cushion interposed between the overlapping arms of said levers, all portions of the levers and the pneumatic cushion being positioned below the upper portions of the treads of the wheels.

2. A pneumatic vehicle suspension according to claim 1, wherein the pneumatic cushion comprises a compressed air chamber carried by one lever and sealed by a flexible diaphragm secured to the other lever.

3. A pneumatic vehicle suspension comprising: a vehicle body, a horizontal pivot supported on the body, wheel carrying spindles normally positioned in substantially the same horizontal plane as the body supporting pivot and arranged fore and aft of said pivot and to which wheels are adapted to be affixed, a lever secured to each wheel spindle and fulcrumed on said pivot with at least one arm of one lever extending beyond the pivot and overlapping the contiguous arm of the other lever, one of said overlapping lever arms being provided with a compressed air chamber having therein an opening, a diaphragm marginally hermetically sealing said opening, and means for securing an overlapping portion of the other lever to said diaphragm.

4. A pneumatic vehicle suspension according to claim 3, wherein the fulcrum pivot of the levers is supported on brackets rigidly mounted with respect to the body of the vehicle.

5. A pneumatic vehicle suspension according to claim 3, wherein the compressed air chamber is formed within the overlapping end of one lever and is provided with an opening closed by a diaphragm normally occupying a substantially horizontal plane.

6. In a vehicle having a body, a pneumatic suspension at each side of the vehicle comprising: a horizontal pivot supported by the body, wheel spindles arranged fore and aft of said pivot to which wheels are adapted to be fixed, a lever secured to each wheel spindle and fulcrumed on said pivot with at least one arm of one lever extending beyond the pivot and overlapping the contiguous arm of the other lever, and a pneumatic cushion interposed between the overlapping arms of said levers, in combination with a flexible radially elastic tube connecting the pneumatic cushions at the opposite sides of the vehicle.

7. A pneumatic suspension according to claim 6 wherein the flexible elastic tube is housed within a protective casing.

References Cited in the file of this patent

UNITED STATES PATENTS

| 1,940,914 | Marcum | Dec. 26, 1933 |
| 2,025,793 | Tschappat | Dec. 31, 1935 |
| 2,427,006 | Knox | Sept. 9, 1947 |
| 2,488,288 | Gouirand | Nov. 15, 1949 |

FOREIGN PATENTS

| 10,749 | Great Britain | May 6, 1909 |